Oct. 5, 1965 W. M. NYE 3,209,974

STORAGE FACILITIES FOR RIBBON-LIKE MATERIAL

Filed Aug. 20, 1962

INVENTOR.
WILLIAM M. NYE

BY [signature]

ATTORNEY

United States Patent Office 3,209,974

Patented Oct. 5, 1965

3,209,974

STORAGE FACILITIES FOR RIBBON-LIKE MATERIAL

William M. Nye, 6633 58th NE., Seattle, Wash.

Filed Aug. 20, 1962, Ser. No. 218,037
3 Claims. (Cl. 226—118)

This invention relates to handling and storing of free-folding, ribbon-like materials. The invention is particularly useful in handling and storing such materials utilized to record and reproduce intelligence.

The purpose of the invention is to provide storage facilities for free-folding, ribbon-like materials which will receive, whenever necessary, substantially the same maximum quantity of free-folded, ribbon-like materials per unit of maximum possible capacity.

An object of the invention is to provide a free-folding tape storage facility which registers the free folds of incoming tape to allow their free fall within storage facilities.

An object of the invention is to provide a ribbon-like material storage facility of constant operating capacity which is quietly operated at low cost.

An object of the invention is to provide a magnetic tape storage facility of potential reoccurring maximum operating capacity, as necessary, which will freely receive and discharge random folds of magnetic tape without tape adherence interference caused by the build up of static electricity on the magnetic tape.

An object of the invention is to provide a ribbon-like material storage facility of potential reoccurring maximum operating capacity, whenever necessary, which is dependably constructed and reliably operated without imposing construction or operation modifications, or restrictions on other associated ribbon-like material handling equipment.

The purpose, these objects and other features of this invention will become more apparent as the following illustrated description of a preferred embodiment of the invention is read. In the accompanying drawings, this preferred embodiment of the invention is illustrated in relationship to recording and reproducing systems such as described in my United States Patent No. 2,988,604. To aid in cross referencing the disclosures of the patent and this specification, similar parts have been numbered alike and letters have been used to identify the parts primarily associated with this invention.

Figures 1, 2, 3, 4, 5:
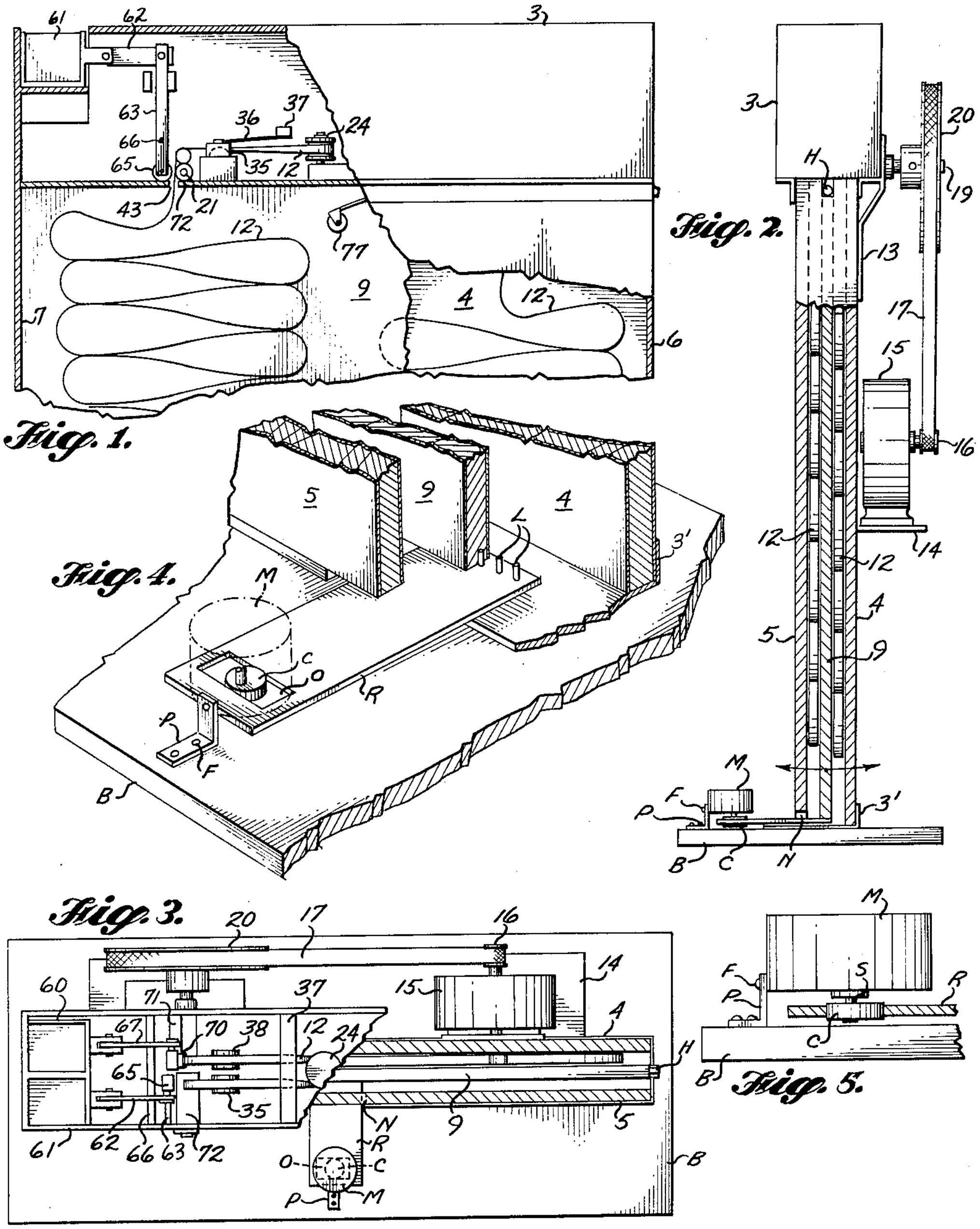
FIGURE 1 is a partial front elevation, with parts broken away, of a recording and reproducing apparatus utilizing the preferred embodiment of the storage facilities for free-folding, ribbon-like material.
FIGURE 2 is a side view, with parts broken away, of the apparatus shown in FIGURE 1.
FIGURE 3 is a top view, with parts broken away, of the apparatus shown in FIGURES 1 and 2.
FIGURE 4 is an enlarged perspective view of part of the storage facility shown in FIGURES 1, 2 and 3, showing both the moving parts and the actuator therefor.
FIGURE 5 is an enlarged partial side view of the actuator, its mounting, cam and connecting rod.

Where there is a requirement for the active storage of ribbon-like materials, there is generally the concurrent requirement that storage facilities be provided which will receive such material in freefolds in such a manner that the material is received quickly and is in constant readiness for its removal either on a last-in, first-out basis or a first-in, first-out basis. Such a requirement is today an established one wherein ribbon-like materials, known more commonly now by the expression of magnetic tapes, serve as the recording and reproducing media of machines dealing with handling of intelligence.

The storage facilities used to accept and temporarily hold the free-folding tapes have at least one dimension at their entrance and throughout their depth which is only slightly greater than the width of the tape being received. This restrictive dimension of the storage facility assures that the random free folds will remain in a chronological order awaiting withdrawal from either end of a recorded message. This restrictive dimensional requirement, however, is the basis for establishing the malfunctioning of tape-handling apparatus used in conjunction with such storage facilities. The malfunction occurs when one or more folds of the tape at edge portions tend to adhere to the inner surfaces of the storage facilities. Such adherence is attributed to several factors among which is the static electricity which tends to build up in certain types of tape and which cannot be overcome without replacing such tape with non-static types of instrumentation tape at considerable extra expense, or for example such adherence may be caused by just residual torsional forces within the tape itself. Whatever be the cause, the result is not wanted, for the adherence of the tape to the walls reduces substantially the operating capacity of the storage facilities.

The reduction of storage capacity by the overly restrictive entrance of free-fold tapes seriously affects operation of equipment relying on otherwise rapid convenient handling of tapes in such storage facilities. The possibility of unwanted restrictions occurring has generally resulted in designing storage facilities on an oversized basis. In this way the designer of the overall equipment estimates the bin storage facilities will be adequate throughout all operations of the entire system even when serious tape fold obstructions occur. This design approach obviously results in higher costs from the time the equipment is made, continuing right on through its entire operation, servicing, repairs, storage, handling, etc. Moreover, the operating protection sought by the designer in making the storage facilities considerably oversized is far from guaranteed. Experience has shown that the tape first entering the bin may seriously adhere to the sides of the bin recesses and present a formidable obstruction to the oncoming tape. This results in possible injury to the tape as large quantities are folded into a restrictive space, and/or the entire operating system may be shut down. In these situations, lost time of equipment is but one part of the cost, for the equipment in the first instance has been designed for reliable operation to carry on timely operations which have a large intrinsic value in themselves. Often the total cost chargeable to the breakdown of the intelligence tape handling equipment and associated systems is very sizable.

Therefore, this invention has been made to overcome this tape storage blockage problem. The invention does this and more, for now the storage facilities used can be reliably filled to a safe maximum tape fold density. This results in the design of more efficient equipment having tape storage facilities matching the capacities required without allowances for malfunctions. Also this guarantees the continued efficient and reliable operation of such intelligence tape storage, handling, reproducing and recording systems.

Such a recording and reproducing system is shown in Patent 2,988,604. This system includes a magnetic tape recorder and playback machine utilizing free-folding tape in a bin or sets of bins. The capacity of the machine is limited by the maximum amount of tape that will fold into a bin at random. Therefore, it is necessary design criteria that the capacity of the bins be related to the performance objectives of the machine. In order to keep the bin capacity at a minimum to meet the machine's specifications there must be assurance that the free-folding tape will fall into the bin with a high degree of consistency. There are many factors which control the manner in which the tape will fold within the bin. The tape never falls at random into the same pattern. Therefore, the maximum amount of tape must necessarily be limited to the tape length which will fold into a bin in such a manner as to occupy the maximum space. However, this maximum space requirement should be minimized as much as possible by eliminating any possibility the tape will not fall freely into the bin one fold upon another.

To attain this objective, it is necessary to avoid binding of any tape fold against the interior of the bin as a tape edge bears or adheres to a bin side blocking the entry of follow on tape folds. Such failure is almost certain to occur because the tape itself is of negligible weight. The additional tape fails to gain a weight capacity tending to dislodge the adhered tape edge. Instead the added tape piles higher upon itself. When this occurs a tape storage bin fills up prematurely and any attempt to force in more tape will wrinkle the tape possibly causing permanent damage.

This invention prevents this type of tape blockage and thereby increases the operating capacity of a given tape bin. The invention accomplishes this operating result by continuously varying the internal restrictive width of the bin. All of the tape folds will be registered when the bin contracts to a dimension substantially equalling the width of the tape and thereafter all tape folds will fall freely when the bin expands to a width slightly greater than the tape width. The continuous process of expanding and contracting the bin while tape is being fed into the bin automatically avoids long adherence of any tape edges to the bin sides.

The expansion and contraction of a bin may be accomplished in many ways. The preferred way involves movement of at least one bin side. FIGURES 1, 2 and 3, taken essentially from the FIGURES 2, 3 and 1 respectively of United States Patent 2,988,604, with parts omitted for purposes of simplifying the understanding of the present invention, illustrate an environment wherein expanding and contracting with bin or bins may be successfully integrated into a system very substantially increasing its reliability. Two tape bins side by side are illustrated. The center partition serves as a common side to both bins and is moved. When one bin is expanding the other adjacent bin is contracting in size across its internal width dimension.

The center partition or common bin side 9 is hinged at its top, H, in cutouts provided in the end walls 6 and 7 of the combined recorder and reproducing units. The other bin sides 4 and 5 therefore can be made permanent and stationary to serve as the side walls of the enclosing bin structure. The center common side 9 is made slightly undersize along its vertical and bottom edges to move freely when force is applied.

As shown in FIGURE 4, such force is applied optionally near the bottom of the common bin side 9 by utilizing movements of a connecting rod R which is interconnected with the center partition 9 by using locating pins L attached to the connecting rod R and inserted into recesses in the partition or side 9. The movement of the connecting rod R is uniform and can be at a low frequency of oscillation. Such movement is powered optionally and conveniently by a small clock motor M driving a shaft to which is affixed a cam C acting like a pall within a cutout O in extending arm of the connecting rod R. As the motor M revolves the connecting rod R oscillates just a small amount approximately and alternately doubling and eliminating the width tolerance normally associated with tape bins. The connecting rod R passes through the notch N located at the bottom of the bin side 5. The motor is conveniently positioned by the bracket P, fastened as necessary to the base B and the motor M with fasteners F. A side view of this arrangement is shown in more detail in FIGURE 5.

Under all operating conditions, the tape 12 can be fully received in either the space between partitions or sides 9 and 5, or the space between the partitions or sides 9 and 4. At any moment if edges of the tape 12 should adhere to any surfaces of sides 5, 9 and 4 the follow-on movement of the center partition or common side 9 will result in clearing the free-folding tape from the internal bin surfaces. The movement of the center partition, or common side 9, causing the alternate contraction and expansion of the bin spaces, will not interfere with the operational withdrawal of the magnetic tape from the bins. The timing of the common side 9 movements to receive the tape 12 in this orderly way is compatible with the withdrawal of the tape 12.

For a better understanding of the movement involved, the following dimensions are given by way of example. In a tape bin designed for ¼" wide tape the width tolerance is 1/16 of an inch. The movement provided by the motor and connecting rod assembly is approximately ⅛ of an inch total, being + or −1/16 of an inch in either direction from a midpoint. Therefore, the internal bin width varies from ¼ of an inch to ⅜ of an inch. Or stated differently, the neutral position of the movable partition would be 5/16" from either non-movable partitions, or sidewalls of the storage facility.

The operating objective of contracting and expanding the inside dimensions of any bin is to alternately register free-folding tape loops and thereafter allowing them to fall freely. The exact manner in which the expanding and contracting is undertaken is not necessarily limited by this preferred embodiment. For example, the entire side of a single bin or both sides of the single bin, or the central common partition or side of dual bins could be moved so both top and bottom edges expand and contract at the same time keeping the parallel relationship of the sides throughout the entire movement cycle. The essential design criterion requires the variance of bin or storage space be related to the restricted internal width which in turn closely approximates the tape width from edge to edge. Such variation of bin width may be accomplished by any assembly of parts compatible with the environment of the apparatus and system into which this invention is incorporated.

The utilization of a vibrating means to vibrate either a movable partition or an otherwise firm assembly, such as shown in Patent 2,988,604, is recognized as a mechanical solution to the tape storage problem. However, when electrical-electronic specifications are considered the vibration approach is no longer satisfactory, for continued vibrations cause harmful fatigue stresses and strains resulting in breakdowns of the tape handling apparatus, and the entire intelligence system. The slow, quiet, steady, almost unnoticed movement of a selected bin partition stands out as an embodiment to be utilized in solving the storage capacity problem.

Air pressure selectively used to direct air streams into tape bin interiors to rearrange the tape folds is also considered as an approach in registering and encouraging the free fall of tape into bins. However, the utilization of an airstream is not considered as dependable nor as economical as the embodiment shown.

A review, for example, of the apparatus and systems shown in prior art patents, such as United States Patents Nos. 2,410,569, 2,542,506, 2,543,483, 2,679,394, 2,742,-284, 2,889,491, and 2,991,920, indicate how this invention with limited modifications might be utilized with several different types of apparatus which store tape in bins, boxes and/or containers.

Operational experience using the invention in conjunction with recording and reproducing systems and other equipment handling ribbon-like materials indicates the operating capacities of present bins can be increased at least threefold when the invention is used to modify such tape storage facilities.

The designers and operators of tape handling apparatus and systems incorporating the invention know the tape storage facilities will handle longer runs of free-folding tape per unit of bin storage capacity, without the provision of excessive tolerances in order to maintain the high reliability standard of tape or ribbon-like material flow.

The invention concerning the apparatus and the method of continuously alternately registering free tape in its numerous folds and allowing such folds to fall freely within restrictive width bin spaces has materially advanced the usefulness of magnetic tape and other ribbon-like materials, especially when such materials are utilized for recording, storing and reproducing important intelligence.

I claim:

1. An intelligence tape bin for the active storage of vertically arranged fold-upon-fold, free folding tape, comprising: a multiple wall body establishing a recess to receive the folding tape having at least two of the multiple walls initially spaced apart providing a minimum clearance adjacent the tape edges to align the tape folds; mounting means on the multiple wall body for the tape-aligning spaced walls movably mounting at least one of these tape edge associated tape aligning walls; and an oscillating actuator to change continuously the spaced tape aligning walls' relative position to another, alternately contacting all the tape edges within the bin to align the tape folds over one another and then slightly withdrawing from all the tape edges within the bin to free the tape intermittently from any substantial otherwise continuous frictional engagement with the tape-aligning spaced walls of the bin whereby greater tape lengths are stored within the active storage.

2. A free folding ribbon-like material storage facility comprising a body having at least one recess for receiving the free flowing ribbon-like material causing the ribbon-like material to be self-folding in a vertical plane upon entry into the recess, the recess being formed by having at least five sides, two of which are initially spaced apart in vertical planes a distance only slightly greater than the width of ribbon-like material to be stored, two of which are spaced apart a distance complementarily matching the free-folding ribbon-like material folds, and a fifth of which joins the bottoms of the two sides which are initially spaced apart a distance only slightlyl greater than the width of ribbon-like material to be stored; mounting devices on the body to movably receive at least one side of the initially slightly greater ribbon width spaced sides of the recess, and actuation apparatus connected between this at least one movably mounted side of the body and a non-movable portion of the body to cause sufficient transverse continuous oscillation of this movable side to and away from all the edges of the ribbon-like material, thereby intermittently freeing the ribbon-like material edges from continuous binding contact with the fold-aligning initially slightly greater ribbon width spaced sides of the body recess.

3. In an intelligence tape recording and playback machine utilizing free folding intelligence tape removed from and discharged into bins, the bins having both movable and non-movable structure and alternately position-cycling actuation means connected between the movable and non-movable structure to continuously during tape loading alternately position the movable structure in substantially vertical planes, first substantially next to all common side edges of tape folds in the bins and those entering one upon the other, and then away from these edges of tape folds, thereby interrupting otherwise sustained frictional engagement of all tape edges with the movable and non-movable structure of the bin interiors, resulting in an increase in the overall intelligence free folding tape length being folded into bins.

References Cited by the Examiner

UNITED STATES PATENTS

| | | | |
|---|---|---|---|
| 1,296,476 | 3/19 | Burnett | 226—118 |
| 2,521,440 | 9/50 | Bannon | 226—118 X |
| 2,679,394 | 5/54 | Lear | 226—118 |
| 2,699,089 | 1/55 | Jakobs et al. | 226—118 X |
| 2,731,262 | 1/56 | Morrow | 226—1 |
| 2,742,284 | 4/56 | Munroe | 226—118 |
| 2,989,594 | 6/61 | McKaig | 226—118 X |
| 3,027,059 | 3/62 | Streeter | 226—118 X |
| 3,137,426 | 6/64 | Brenneisen | 226—118 X |

ROBERT B. REEVES, *Acting Primary Examiner.*

ANDRES H. NIELSEN, RAPHAEL M. LUPO, ERNEST A. FALLER, *Examiners.*